(12) United States Patent
Cheng

(10) Patent No.: US 9,126,654 B1
(45) Date of Patent: Sep. 8, 2015

(54) ELECTRIC BICYCLE MOTOR POWER CONTROL APPARATUS

(71) Applicant: Taiwan Hodaka Industrial Co., Ltd., Taipei (TW)

(72) Inventor: Paul Cheng, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 0 days.

(21) Appl. No.: 14/280,738

(22) Filed: May 19, 2014

(51) Int. Cl.
*B62M 6/45* (2010.01)
*B62M 6/50* (2010.01)

(52) U.S. Cl.
CPC .. *B62M 6/45* (2013.01); *B62M 6/50* (2013.01)

(58) Field of Classification Search
CPC .... A61N 1/36003; A43B 13/145; A43B 5/18; A43B 7/144; A43B 7/1445; A61H 1/02; A61H 2230/08; B62M 6/45; B62M 6/50
See application file for complete search history.

(56) References Cited

U.S. PATENT DOCUMENTS

| 5,890,996 | A | * | 4/1999 | Frame et al. | 482/8 |
| 5,957,814 | A | * | 9/1999 | Eschenbach | 482/51 |
| 6,090,013 | A | * | 7/2000 | Eschenbach | 482/52 |
| 6,090,014 | A | * | 7/2000 | Eschenbach | 482/52 |
| 6,168,552 | B1 | * | 1/2001 | Eschenbach | 482/52 |
| 6,210,305 | B1 | * | 4/2001 | Eschenbach | 482/52 |
| 6,361,476 | B1 | * | 3/2002 | Eschenbach | 482/52 |
| 7,814,800 | B2 | | 10/2010 | Roovers et al. | |
| 2004/0220019 | A1 | * | 11/2004 | Maser | 482/52 |
| 2005/0015118 | A1 | * | 1/2005 | Davis et al. | 607/49 |
| 2010/0248905 | A1 | * | 9/2010 | Lu | 482/57 |
| 2014/0317959 | A1 | * | 10/2014 | Elbaz et al. | 36/88 |

* cited by examiner

*Primary Examiner* — James Trammell
*Assistant Examiner* — James E Stroud
(74) *Attorney, Agent, or Firm* — Alan D. Kamrath; Kamrath IP Lawfirm, P.A.

(57) ABSTRACT

An electric bicycle motor power control apparatus performs a linear program for a compensation signal through a linear computation module according to the data such as exercise strength and pedaling angle of a user pedaling a bicycle, and transmits the signal to a proportion and integration module for computation to provide a stable input power to a motor, so as to achieve the effects of controlling the motor output, minimizing the change of periodical output while the user is pedaling the pedal, and providing a mild and consistent motor output.

8 Claims, 4 Drawing Sheets

US 9,126,654 B1

ELECTRIC BICYCLE MOTOR POWER CONTROL APPARATUS

BACKGROUND OF THE INVENTION

1. Field of the Invention

The present invention relates to an electric bicycle motor power control apparatus, and more particularly to the electric bicycle motor power control apparatus capable of effectively minimizing a change of motor periodical outputs while pedaling the bicycle and providing a mild and consistent motor output to the bicycle.

2. Description of the Related Art

The magnitude of a motor output of a conventional electric bicycle is mainly determined and controlled by the following two methods:

(1) The motor output is controlled according to the moving speed of pedaling (or a crank).

(2) The motor output is controlled by a pedaling (crank) movement speed. The higher the pedaling movement speed, the faster the assisting force provided by motor. In such control mode, the motor output can be adjusted according to the pedaling speed (wherein the motor output is directly proportional to the pedaling speed) while riding an electric bicycle. However, if the bicycle is climbing a slope, the pedaling speed will be reduced due to the steep slope, and the motor output will be lowered, and thus resulting in the situation that the electric bicycle cannot climb up the slope or move forward.

(3) The motor output is controlled by the pedaling torque. In other words, the motor output is controlled according to the pedaling torque. The larger the pedaling torque, the larger is the motor output. U.S. Pat. No. 7,814,800 applies this control method. In FIG. 1, when a user pedals a pedal, and the crank 1 is moved to the position 0, the torque value is equal to 0; when the crank 1 is moved to the position 90, maximum torque is produced; when the crank 1 is moved to the position 180, the torque value is equal to 0. Therefore, when the pedal is pedaled to the position 360, the relation with torque is shown in FIG. 2, and there is a too-large change of waveforms to cause the motor to produce a too-large change of periodical outputs. In other words, the pedal is moved to the position 360. A different output is produced in a movement period, and thus causing the rider to have an uncomfortable feeling.

SUMMARY OF THE INVENTION

In view of the foregoing drawbacks of the prior art, the inventor or the present invention designed and developed an electric bicycle motor output apparatus in accordance with the present invention to overcome the drawback of the prior art.

Therefore, it is a primary objective of the present invention to provide an electric bicycle motor power control apparatus capable of effectively minimizing a change of motor periodical outputs while pedaling the bicycle and providing a mild and consistent motor output to the bicycle.

To achieve the aforementioned object, the present invention provides an electric bicycle motor power control apparatus that performs a linear program for a compensation signal through a linear computation module according to the data such as exercise strength and pedaling angle of a user pedaling a bicycle, and transmits the signal to a proportion and integration module for computation to provide a stable input power to a motor, so as to achieve the effects of controlling the motor output, minimizing the change of periodical output while the user is pedaling the pedal, and providing a mild and consistent motor output.

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 1:
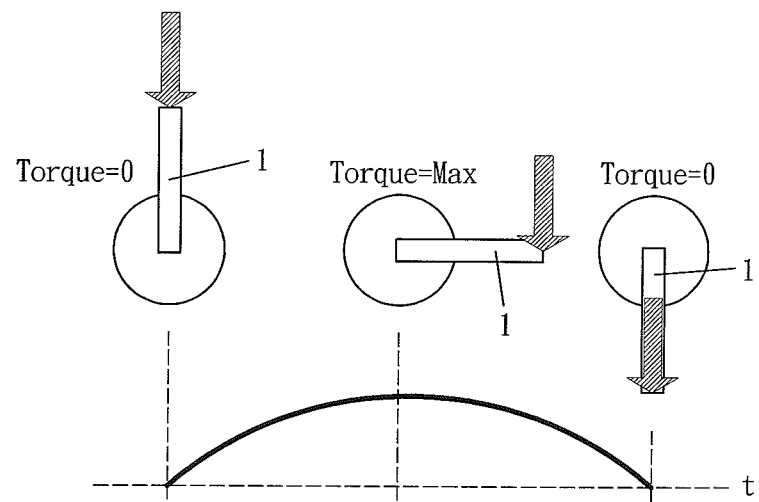
FIG. 1 is a schematic view showing the relation between a pedaling angle of 180° and a torque so produced by a conventional bicycle.
Figure 2:
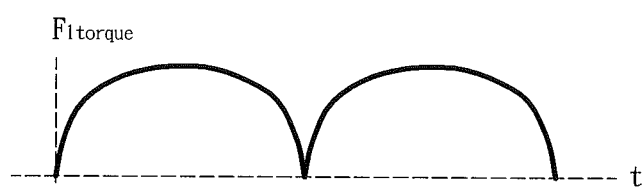
FIG. 2 is a schematic view showing the relation between a pedaling angle of 360° and a torque so produced by a conventional bicycle.
Figure 4:
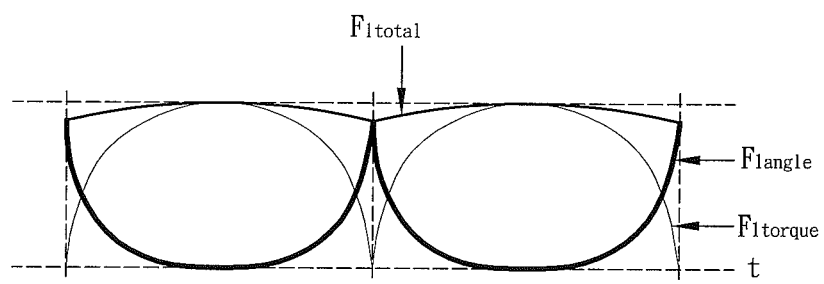
FIG. 4 is a reference diagram showing a control apparatus providing a compensation calculation according to a pedaling angle in accordance with the present invention.
Figure 3:
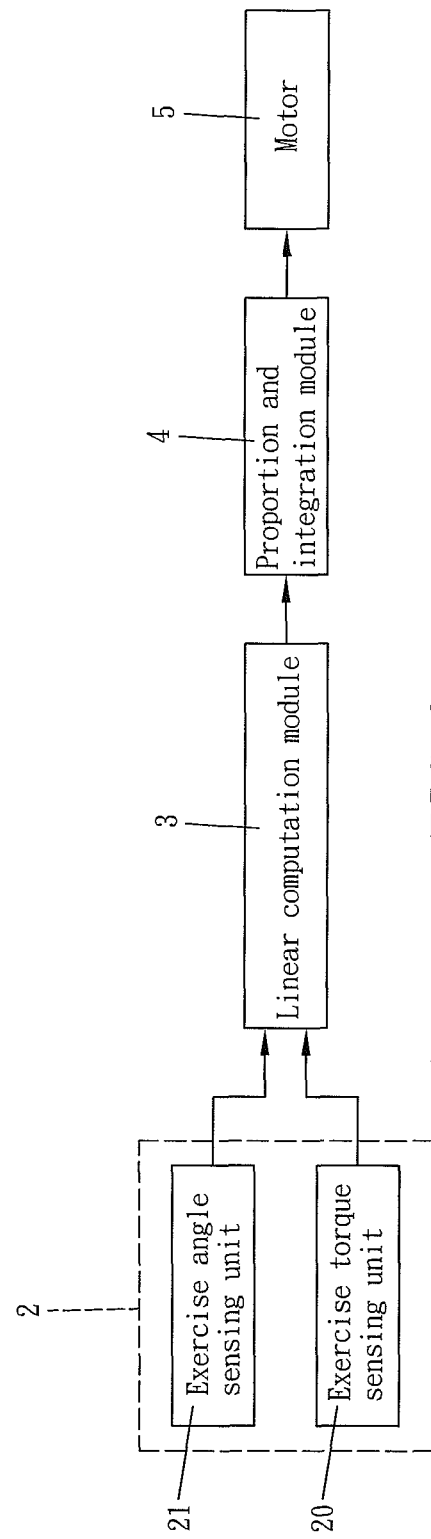
FIG. 3 is a block diagram showing the flow of a control apparatus in accordance with the present invention.

With reference to FIG. 3 for an electric bicycle motor power control apparatus in accordance with a preferred embodiment of the present invention, the electric bicycle motor power control apparatus comprises:

a detection module 2, having an exercise torque sensing unit 20 and an exercise angle sensing unit 21, wherein the exercise torque sensing unit 20 is installed at a bicycle frame or a pedal shaft and provided for measuring a deformation of the bicycle frame or the pedal shaft, which is also known as the rider's pedaling torque, and the exercise angle sensing unit 21 is a Hall sensor that may be installed at the pedal shaft for measuring the pedaling angle;

a linear computation module 3, for receiving data detected by the exercise torque sensing unit 20 and the exercise angle sensing unit 21 of the detection module 2 and then performing a compensation computation and a linear programming as shown in FIG. 4, wherein, $F_{1torque}$ is the output produced by the pedaling torque with a computation formula of $F_{1torque}=[a1\times F(torque)(t)]$, wherein a1 is a torque adjustment parameter, F(torque) is a torque, and t is time, and $F_{1angle}$ is a compensated output computed according to the pedaling angle by the linear computation module 3 with a computation formula of $F_{1angle}=[a2\times F(angle)(t)]$, wherein a2 is a pedaling adjustment parameter, F(angle) is a pedaling angle, and t is time, and the total output of the motor 5 $F_{1total}=F_{1torque}[a1\times F(torque)(t)]+F_{1angle}[a2\times F(angle)(t)]$; for example, $F_{1torque}=a1\times|Sin(\omega10+\omega11t)|$, $F_{1angle}=a2\times|Sin(\omega20+\omega21t)|$, wherein a1 is a torque adjustment parameter, $\omega10$ is a torque exercise initial phase angle, $\omega11$ is a torque period, a2 is a pedaling adjustment parameter, $\omega20$ is a pedaling exercise initial phase angle, $\omega21$ is a pedaling period, and t is time, and with the compensation computation and the linear programming performed by the linear computation module 3, a mild signal is outputted; and a proportion and integration module 4, which is a PI controller, for receiving a signal generated after the linear computation module 3 performs a compensation computation and a linear programming and compares the collected data with a reference value, and adjusts an input value according to history data and a difference occurrence rate, so that the data can be outputted more quickly and stably.

Since the signals outputted by the proportion and integration module 4 are substantially linear, therefore a mild, consistent and stable power can be supplied to the motor 5, and the output of the motor 5 is stable and consistent without the occurrence of changes in the periodical output. In addition, if the bicycle climbs a slope, the motor 5 will produce an output force according to a change directly proportional to the data detected by the exercise torque sensing unit 20 to provide a riding assisting force to the bicycle. If the pedaling angle of the bicycle is changed, the motor 5 will change the output force according to the angle data detected by the exercise angle sensing unit 21.

Figure 5:
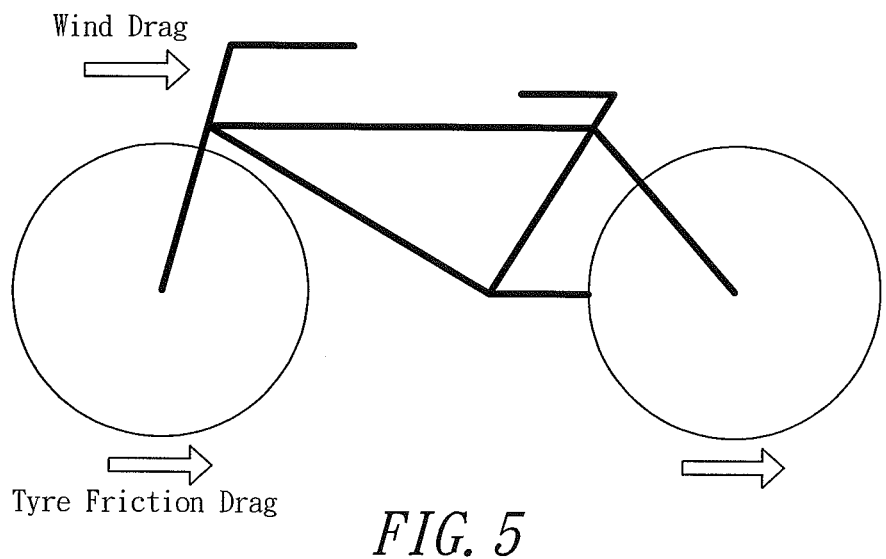
FIG. 5 is a schematic view showing the relation between tyre friction drag and wind drag of a conventional bicycle.
Figure 6:
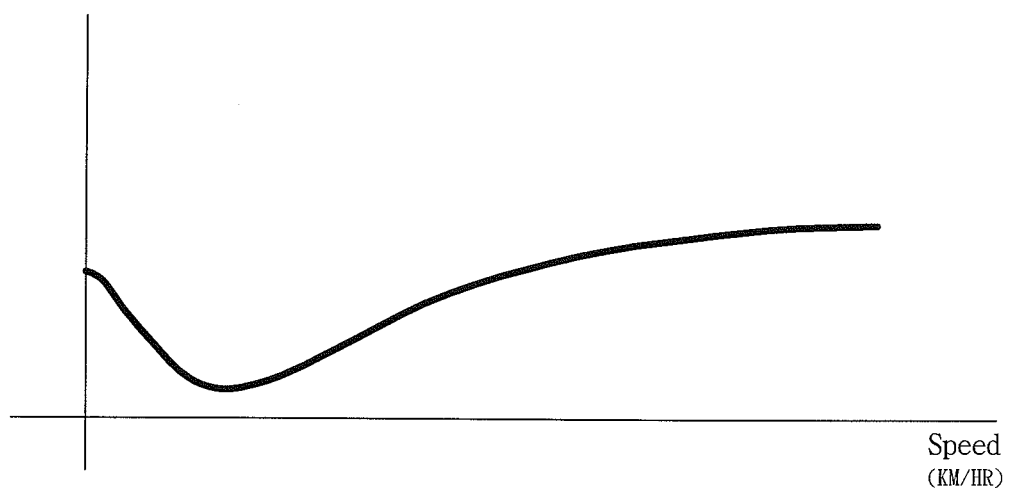
FIG. 6 is a graph of a total drag versus speed of a conventional bicycle.
Figure 7:
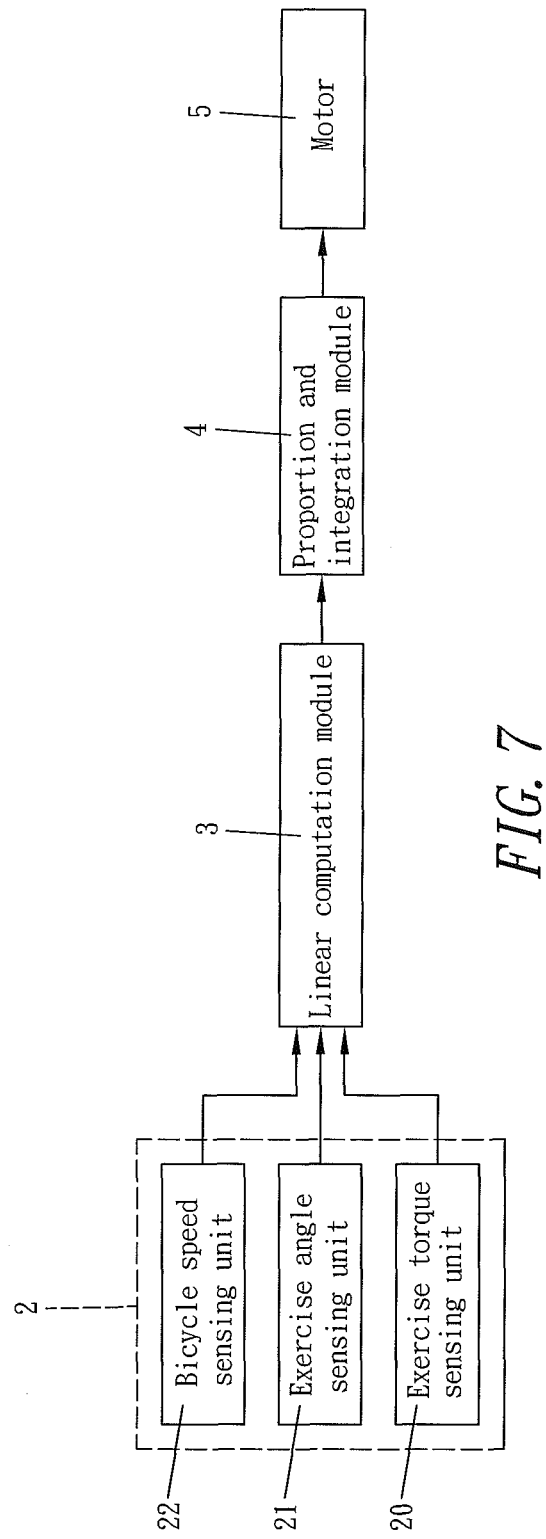
FIG. 7 is a block diagram of a control flow of a control apparatus comprising a bicycle speed sensing unit in accordance with the present invention.

In FIGS. 5 and 6, the bicycle produces a drag in the exercise process, and the drag is primarily the tyre friction drag, and wind drag, and the function of these two drags and the bicycle speed is shown in FIG. 6. To provide a comfortable ride of the bicycle, the detection module 2 of the present invention further includes a bicycle speed sensing unit 22 (as shown in FIG. 7) for detecting a bicycle speed, and the linear computation module 3 computes $F_{2total}=b1 \times F_{tyre\ fiction\ drag}(speed)+b2 \times F_{wind\ drag}(speed)$ according to the relation between the bicycle speed and the drag (as shown in FIG. 6), wherein b1 and b2 are constant, $F_{tyre\ friction\ drag}$ is a tyre friction drag, $F_{wind\ drag}$ is a wind drag to provide the output of the motor 5 for offsetting the drag. The total output $F_{motor}=F_{1total}+F_{2total}$. Wherein, $F_{1total}$ of the total motor output is obtained according to the compensated exercise torque and angle, and $F_{2total}$ is obtained according to the compensated drag and bicycle speed, so as to provide a comfortable ride of the bicycle.

From the description above, the present invention provides an electric bicycle motor power control apparatus capable of performing a computation and a linear program by the linear computation module 3 according to the changed data of a user's pedaling strength and pedaling angle, and then providing a signal to a proportion and integration module 4 and comparing the signal with a reference value in order to adjust an input value according to history data and a difference occurrence rate, so that the output data can be more accurately and stably, and a mild, consistent and stable power can be supplied to the motor 5. Therefore, the output of the motor 5 is stable and consistent without the occurrence of changes of the periodical output. Preferably, the present invention further comprises a bicycle speed sensing unit 22 for providing bicycle speed data, so that the motor 5 can provide an output for offsetting the drag to provide a more comfortable ride of the bicycle.

In summation of the description above, the present invention complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:

1. An electric bicycle motor power control apparatus, comprising:
    a detection module, having an exercise torque sensing unit and
    an exercise angle sensing unit, wherein the exercise torque sensing unit is provided for measuring a pedaling torque of a bicycle and the exercise angle sensing unit is provided for measuring a pedaling angle;
    a linear computation module, for receiving data sensed by the exercise torque sensing unit and the exercise angle sensing unit of the detection module, and then performing a compensation calculation and a linear programming to output a signal; and
    a proportion and integration module, for receiving a signal generated after the linear computation module has performed a compensation and a linear programming, comparing the collected signal data with a reference value, and adjusting an input value according to history data and difference occurrence rate, so that the data output is more accurate and stable to supply a mild, consistent and stable power to a motor to stabilize the motor output consistently.

2. The electric bicycle motor power control apparatus of claim 1, wherein the linear computation module produces a compensated output according to the pedaling torque with a computation formula of $a1 \times F(torque)(t)$, and $a1$ is a torque adjustment parameter, and $t$ is time, and $F(torque)$ is torque, and a compensated output according to the pedaling angle with a computation formula of $a2 \times F(angle)(t)$, wherein $a2$ is a pedaling adjustment parameter, $t$ is time, and $F(angle)$ is a pedaling angle, and the total motor output is the sum of the two compensated outputs.

3. The electric bicycle motor power control apparatus of claim 2, wherein the linear computation module produces a compensated output according to pedaling torque with a computation formula of $F(torque)(t)$ which is equal to $|Sin(\omega 10+\omega 11t)|$, and a compensated output according to the pedaling angle with a computation formula of $F(angle)(t)$ which is equal to $|Sin(\omega 20+\omega 21t)|$, wherein $\omega 10$ is a torque exercise initial phase angle, $\omega 11$ is a torque period, $\omega 20$ is a pedal exercise initial phase angle, $\omega 21$ is a pedaling period, and $t$ is time.

4. The electric bicycle motor power control apparatus of claim 3, wherein the detection module further comprises a bicycle speed sensing unit for detecting a bicycle speed, and provides a motor output for offsetting a drag after the linear computation module computes according to a function of the bicycle speed and the drag and the proportion and integration module compares and adjusts the data signal.

5. The electric bicycle motor power control apparatus of claim 4, wherein the linear computation module provides a motor output for offsetting a drag with a computation formula of $F_{2total}=b1 \times F_{tyre\ friction\ drag}(speed)+b2 \times F_{wind\ drag}(speed)$, wherein b1 and b2 are parameters, $F_{tyre\ friction\ drag}$ is a tyre friction drag, and $F_{wind\ drag}$ is a wind drag.

6. The electric bicycle motor power control apparatus of claim 5, wherein the exercise angle sensing unit of the detection module is a Hall sensor installed at a shaft of the pedal.

7. The electric bicycle motor power control apparatus of claim 5, wherein the exercise torque sensing unit is installed on a bicycle frame for measuring a bicycle frame deformation to measure a pedaling torque of the bicycle.

8. The electric bicycle motor power control apparatus of claim 5, wherein the exercise torque sensing unit is installed at a shaft of the pedal for measuring a bicycle frame deformation to measure a pedaling torque of the bicycle.

* * * * *